United States Patent [19]
Potter et al.

[11] Patent Number: 5,663,250
[45] Date of Patent: Sep. 2, 1997

[54] DEPROTECTION WITH MOLTEN SALT

[75] Inventors: Michael Wayne Potter, Sugar Land; William Charles Malven; Cary Alan Veith, both of Houston, all of Tex.

[73] Assignee: Shell Oil Company, Houston, Tex.

[21] Appl. No.: 648,947

[22] Filed: May 16, 1996

[51] Int. Cl.$^6$ .................................. C08F 4/46; C08F 8/00
[52] U.S. Cl. .......................... 526/178; 525/272; 525/314; 525/332.9; 525/333.1; 525/333.2; 525/333.3; 525/333.5; 525/338; 525/340; 525/344; 525/367; 528/487
[58] Field of Search ...................................... 525/344, 367, 525/331.9, 332.9, 333.3, 338, 333.1, 333.2, 272, 314, 340, 333.5; 526/178, 181; 528/487

[56] References Cited

U.S. PATENT DOCUMENTS

| | | |
|---|---|---|
| Re. 27,145 | 6/1971 | Jones . |
| 2,999,891 | 9/1961 | Gleason et al. . |
| 3,600,463 | 8/1971 | Hagemeyer, Jr. et al. . |
| 3,700,633 | 10/1972 | Wald et al. . |
| 3,803,113 | 4/1974 | Gluntz et al. . |
| 4,156,075 | 5/1979 | Holliday et al. . |
| 4,191,628 | 3/1980 | McDowell . |
| 4,417,029 | 11/1983 | Milkovich . |
| 4,518,753 | 5/1985 | Richards et al. . |
| 4,528,364 | 7/1985 | Prier . |
| 4,677,231 | 6/1987 | Aoshima et al. . |
| 4,753,991 | 6/1988 | Bronstert . |
| 4,855,509 | 8/1989 | Dave et al. . |
| 5,104,972 | 4/1992 | Madgavkar et al. . |
| 5,177,297 | 1/1993 | Gibler . |
| 5,212,285 | 5/1993 | Diaz et al. . |
| 5,220,100 | 6/1993 | Massie et al. . |
| 5,288,849 | 2/1994 | Garcin et al. . |
| 5,331,058 | 7/1994 | Shepherd et al. .................. 526/178 X |
| 5,376,745 | 12/1994 | Handlin, Jr. et al. .................. 526/178 |
| 5,416,168 | 5/1995 | Willis et al. . |

FOREIGN PATENT DOCUMENTS

| | | |
|---|---|---|
| 070789 | 7/1981 | European Pat. Off. . |
| 589041 | 6/1992 | European Pat. Off. . |
| 91/12277 | 8/1991 | WIPO . |

*Primary Examiner*—Fred Teskin

[57] ABSTRACT

Protected functional initiator initiated elastomer solutions are deprotected and optionally ionic impurities removed by contact with a molten component such as sodium bisulphate monohydrate. This allows deprotection and removal of metal contaminants such as the initiator or residue from hydrogenation catalysts without the introduction of significant amounts of additional water which cause emulsion formation. In accordance with this invention, better metal removal is achieved and the process of metal removal operates more smoothly because of the absence of emulsion formation. Separation of the molten component containing the extracted metal contaminants can easily be carried out by simple liquid-liquid phase separation on either a continuous or batch basis.

20 Claims, 2 Drawing Sheets

DEPROTECTION WITH MOLTEN SALT

BACKGROUND OF THE INVENTION

This invention relates to anionic polymerization using protected functional initiators.

Anionic polymerization using an alkali metal initiator is well known. Generally, an alkyl lithium such as secondary butyl lithium is used. It is sometimes desirable to incorporate functional groups at the ends of polymer chains, particularly elastomeric polymer chains. Polymers formed from monolithium initiators can be terminated with ethylene oxide to give an —OLi structure at one end which can be utilized for incorporating a functional group, but this leaves the other end without a functional group. The incorporation of functional groups can be done with dilithium initiators simply by adding a terminating agent such as ethylene oxide which gives terminal lithium-oxygen structures at each end of the polymer. However, such polymers tend to form gels.

Recently, a technique has been developed to provide functional groups at each end, utilizing what is called a protected functional initiator (PFI). At the end of the polymerization the protective group is removed (deprotection) to give the desired terminal functional group. While the protecting group can be removed to give the functionality, it is somewhat difficult to practice and is costly. Deprotection of polymers of this type required contacting with a molar excess (5× stoichiometry) of a strong organic acid, such as methanesulfonic acid, and a compatibilizing cosolvent such as isopropanol (about 20% wt). This mixture is then stirred at elevated temperatures (about 50° C.) until the polymer is deprotected (several hours depending on the specific initiator that is used). When the polymer has been deprotected, it is then necessary to neutralize the acidic hydrolysis catalyst, wash out the spent acid salt, and distill out the compatibilizing cosolvent. These additional steps add time and cost to the process.

At the conclusion of any anionic polymerization using an alkali metal catalyst, the metal remains in the reaction medium. Also many end uses require hydrogenation of the polymer to remove nonaromatic unsaturation which results in the presence of metallic hydrogenation catalyst residues, all of which must be removed before the polymer can be utilized.

Filtration has long been known as a method of removing insoluble metal contaminants. However, filtration of viscous polymer solutions is generally slow and expensive. It is well known to extract metal with aqueous solutions of acids or chelates. This approach is frequently unsatisfactory because of emulsion formation, requirements of extended settling times, or the saturation of the organic phase with water. Also polymers, particularly elastomers, have limits on how harshly they can be treated without decomposing.

SUMMARY OF THE INVENTION

It is an object of this invention to provide a deprotection technique which does not require compatibilizing cosolvents;

It is a further object of this invention to simultaneously deprotect and remove ionic contaminants from polymer solutions; and It is a further object of this invention to avoid emulsion formation in the removal of metal such as lithium from polymer solutions.

In accordance with this invention a polymer solution prepared using a protected functional initiator is contacted with a molten component capable of removing the protecting group and thereafter the molten component is separated from the polymer solution.

BRIEF DESCRIPTION OF THE DRAWINGS

In the drawings, forming a part hereof, wherein like reference characters denote like parts in various views.

DETAILED DESCRIPTION OF THE INVENTION

Figure 1:
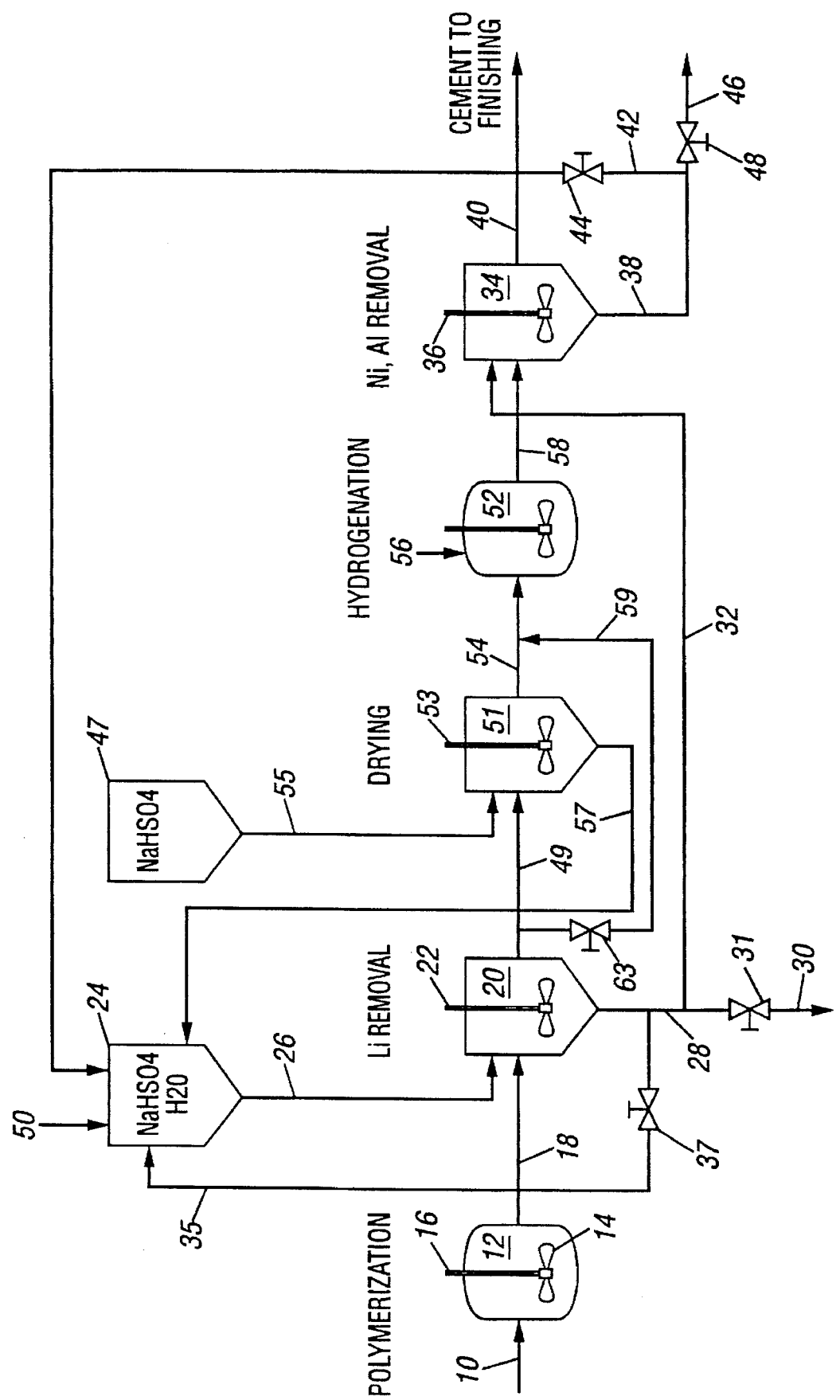
FIG. 1 is a flow diagram of a polymerization process including deprotection and initiator removal followed by hydrogenation and polymer cement recovery.

It has been found that a molten component such as a bisulphate salt will effectively remove a protecting group without the necessity for compatibilizing solvents. It has been further found that such a process will simultaneously remove contaminants such as lithium catalyst residue from polymer solutions avoiding emulsion formation which can occur with conventional catalyst removal. This has the further benefit of allowing easier separation after the treatment is complete since the molten phase is substantially more dense than the organic phase. Finally, rather than having to accept a trade-off in effectiveness in order to avoid the introduction of large amounts of water and/or compatibilizing solvents, the molten system has more capacity to remove contaminants than an aqueous composition has.

The molten component can be any material which is liquid under the conditions employed for the deprotection and which is capable of reacting with the protecting group without significantly harming the polymer. Acid salts, organic acids, chelating agents, and eutectic mixtures of salts are suitable. By way of non-limiting example, deprotection and initiator removal from lithium catalyzed elastomers is generally carried out at 30° to 150° C., more generally at 50° to 80° C., most generally at about 65° C. Thus sodium bisulphate monohydrate which melts at 58.5° C. is ideally suited for such a reaction because of its melting point and its ability to provide a source of acidic protons. Salts such as mono basic sodium phosphate dihydrate (sodium dihydrogenphosphate dihydrate), sodium orthophosphite pentahydrate, sodium acid phosphite pentahydrate, and sodium sulphate decahydrate can also be used but are much less desirable because of larger amounts of water of hydration.

Deprotection techniques are described in U.S. Pat. No. 5,416,168, the disclosure of which is hereby incorporated by reference and also in WO 91/12277. These processes utilize an initiator having the structure R"OR'—Li where R" is a protecting group, i.e. $R_3Si$—O—R'—Li where the R groups are alkyl or a pair of alkyl groups and hydrogen and R' is an alkylene group. After the polymerization is complete, termination with ethylene oxide results in the conventional LiO-polymer structure at one end and results in no change at the other end, since it is protected by the protecting group. Thereafter the protecting silyl group can be removed by a technique called "deprotection". It has been found in accordance with this invention that in such protected functional initiator systems the employment of the molten component results in "deprotection" and removal of the undesirable metal contaminants. This overall process can be exemplified as follows where the precursor to the protected functional initiator is produced from trimethylsilyl chloride and 3-chloro-2,2-dimethylpropanol. This product is reacted with lithium to give the initiator. Polymer is then formed from a monomer such as 1,3-butadiene and the reaction terminated with ethylene oxide. A molten component is then utilized in accordance with this invention to "deprotect" thus removing the organosilyl group from one end and removing the lithium from the other.

This can be viewed broadly as follows

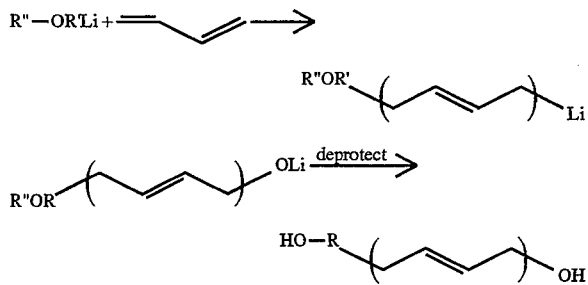

This can be viewed more specifically as follows:

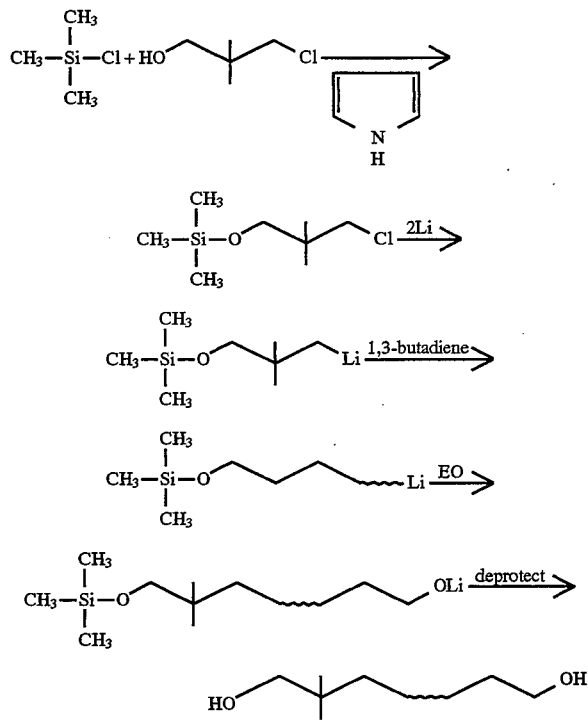

While residues from the initiator and/or hydrogenation catalyst can be separately removed prior to deprotection, it is preferred to carry out both deprotection and at least initiation catalyst removal in a single step.

The impurities which can be removed along with the deprotection include polymerization catalyst and catalyst used for subsequent treatment such as hydrogenation. In instances where metal may be present in metallic form, i.e. zero valent metal, the composition can be subjected to an oxidation treatment to convert the metal to an ion.

There must be sufficient contact between the molten component and the protecting group (and any ion being removed) that a chemical reaction can take place. Presumably the ion removal proceeds by ion exchange as shown by the following exemplary equation wherein an excess of sodium bisulphate monohydrate is contacted with a solution of elastomer prepared using a PFI initiator followed by ethylene oxide to terminate the reaction and introduce an oxygen between the lithium and the polymer chain.

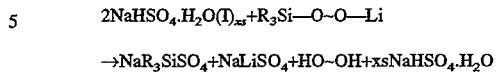

→$NaR_3SiSO_4$+$NaLiSO_4$+HO–OH+xs$NaHSO_4.H_2O$

As noted above in the case of contaminants in the metallic state such as nickel remaining from a hydrogenation reaction, oxidation may be required prior to extraction as depicted below.

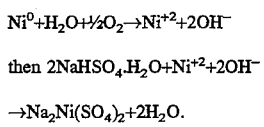

then $2NaHSO_4.H_2O$+$Ni^{+2}$+$2OH^-$

→$Na_2Ni(SO_4)_2$+$2H_2O$.

After the deprotection and ion exchange, or neutralization of the lithium alkoxide with the sodium bisulphate monohydrate or other suitable molten salt, the resulting sodium lithium sulphate can dissolve in the molten excess sodium bisulphate monohydrate. The molten salt, being more dense than the organic phase allows rapid phase separation and avoids the emulsion problems which would be encountered if an aqueous extraction system were utilized.

The deprotection and extraction reactions of this invention can be carried out at any suitable temperature sufficiently high to be above the melting point of the molten component but below that temperature at which the polymer would degrade. It is generally desired to stay below 150° C. with temperatures in the range of 50° to 80° C. generally being employed. While this does limit the number of salts which can be utilized such is unavoidable since the temperature must be at least slightly elevated above room temperature to produce a workable solution viscosity and must be low enough so that polymer does not degrade. Pressure or reflux can be chosen in a conventional manner to be sufficient to maintain the solvent in a liquid state at the temperature utilized.

Any suitable time can be utilized depending on the degree of physical agitation utilized to the effect contact between the reactants and the percentage reduction in contaminants that it is desired to achieve. The process may be carried out on either a continuous or batch basis with contact time as little as 1 minute or as much as 24 hours, but will generally be from about 5 minutes to about 5 hours, more preferably 10 minutes to 2.5 hours.

Mixing can be carried out by stirring, shaking or tumbling using static mixers, mixer-settlers, centrifugal contactors or other conventional devices. A continuous process can be used whereby the two phases are passed cocurrently or countercurrently, for instance through a column equipped with rotating paddles.

Whether a continuous or batch process is used, at the conclusion of the reaction, the material is simply allowed to settle which occurs very quickly because of the density of the molten phase. At this point, the two phases may be separated by any conventional means such as decantation or draining off of the lower phase in either a batch or continuous mode. Preferably the separation is effected by decantation using a sightglass or conductivity probe to detect the interface.

The molten salt will always be used in an excess relative to that needed to react with the ions so as to provide a more dense continuous liquid phase to contain the removed material. Thus, the ratio of molten component to impurities can be within the range of about 2:1 to about 200:1 based on equivalents, which in the case of sodium hydrogen sulphate monohydrate to remove lithium is the same thing as being based on moles. More generally an equivalent ratio of 2:1 to 100:1 would be utilized with 2:1 to 30:1 being preferred. Actually, the upper limit is set only by economic conditions since anything more than 200:1 would offer little extraction advantage and would be more expensive.

Elastomers produced by alkali metal initiated polymerizations are sometimes used as produced without any further treatment prior to recovery from the reaction mixture. Frequently, however, a polymer with reduced aliphatic unsaturation is desired which necessitates a hydrogenation step. This is preferably carried out prior to polymer recovery and utilizes a catalyst which can add additional metals to the reaction composition. In some instances it is believed that the removal of alkali metal from a polymer solution generated by anionic polymerization, prior to its hydrogenation, is beneficial. Accordingly, this invention can be utilized to deprotect and remove metal contaminants such as lithium immediately after the polymerization followed by separation of the phase containing the removed contaminants and either direct recovery of the polymer or hydrogenation of the polymer prior to recovery. Hydrogenation techniques are set out in U.S. Pat. No. Re 27,145 (Jun. 22, 1971), U.S. Pat. No. 3,700,633 (Oct. 24, 1972), and U.S. Pat. No. 4,970,254 (Nov. 13, 1990), the disclosures of which are hereby incorporated by reference.

Alternatively, it is possible to carry out the hydrogenation in the presence of alkali metal and thereafter deprotect and remove both the alkali metal initiator and the hydrogenation catalyst cations in a single step.

The term "elastomer" is used herein in its conventional sense as applied to thermoplastic elastomers or vulcanized rubber. By polymer cement is meant elastomer dissolved in a "solvent" which can be the monomer or other suitable solvent.

Referring now to FIG. 1 there is shown, for illustrative purposes, one embodiment of the invention wherein monomer, solvent and PFI initiator are introduced via feed line 10 into a reaction zone formed by reactor 12. The reaction mixture is stirred by means of a blade 14 rotated by shaft 16. Polymer cement comprising lithium terminated polymer and solvent are withdrawn by a first transfer line 18 and introduced into a deprotection and lithium removal zone formed by contact vessel 20, contents of which are mixed by agitator means 22 which is similar to shaft 16 and blade 14. Molten sodium bisulphate monohydrate is transferred from a storage zone formed by storage vessel 24 to contactor vessel 20 via a second transfer line 26. The sodium bisulphate monohydrate is heated to a molten condition in vessel 24 by conventional heating means not shown. A heavier lower phase of excess sodium bisulphate monohydrate containing sodium silyl sulphate and sodium lithium sulphate as a result of the optional simultaneous removal of lithium from the polymer cement is withdrawn from a contactor vessel 20 via lithium containing salt removal line 28. A portion of partly spent salt can be recovered via first recovery line 30 controlled by valve 31 while the salt necessary for Ni and Al removal is transferred via third transfer line 32 to a hydrogenation catalyst removal zone formed by catalyst removal vessel 34. If desired, excess molten salt can be used so as to give a higher salt to organic ratio in contact vessel 20. If this is done, the excess can be removed via line 35 controlled by valve 37 and recycled to storage vessel 24. The contents of vessel 34 are mixed by means of mixing means 36 which is similar to shaft 16 and blade 14. This catalyst removal can be done by conventional means such as organic or inorganic acids but is preferably done by means of contact with additional molten material such as that used for the deprotection and lithium removal, i.e., molten sodium bisulphate monohydrate. The sodium bisulphate monohydrate introduced as previously shown via line 32 can be reheated if necessary by means of conventional heating means not shown. The heavier molten excess sodium bisulphate monohydrate phase containing dissolved silyl sulphate and sulphates of lithium, nickel and aluminum is withdrawn via hydrogenation catalyst containing salt removal line 38 and finished polymer cement removed via product recovery line 40. If desired, catalyst removal vessel 34 can be operated using an excess of the molten salt so as to give a higher salt to organic ratio. This excess is then withdrawn via line 42 controlled by valve 44 and recycled to a storage zone defined by storage vessel 24. The remaining partly spent salt is then recovered via line 46 controlled by valve 48. Make-up salt is introduced via make-up line 50. This can either be new salt or salt recovered via lines 30 and/or 46 which has been purified.

Since it is desirable in lithium initiated elastomer polymerizations to maintain essentially anhydrous conditions to avoid premature termination of the chains, and since water in the polymer cement is undesirable because of the potential for emulsion formation, it is preferable to maintain essentially anhydrous conditions throughout the system.

Accordingly, the polymer cement effluent from the lithium removal zone can optionally be transferred via fourth transfer line 49 to a drying zone defined by drying vessel 51 having an agitator means 53. Sodium bisulphate from a holding zone defined by holding vessel 47 is transferred via fifth transfer line 55 to drying vessel 51 where it absorbs any water thus producing sodium bisulphate monohydrate which is transferred via sixth transfer line 57 to storage vessel 24. Polymer cement either directly from contactor vessel 20 via line 59 controlled by valve 63 or from optional drying vessel 51 is introduced into a hydrogenation zone formed by hydrogenation vessel 52 via seventh transfer line 54 where it is contacted with a catalyst such as a conventional nickel aluminum hydrogenation catalyst and with hydrogen, all of which can be introduced via introduction means 56 which can be a single line or a multiple lines. After conventional contact with the hydrogenation catalyst to effect conventional hydrogenation, the thus hydrogenated polymer cement is withdrawn via hydrogenated polymer withdrawal line 58 and introduced into the hydrogenation catalyst removal vessel 34.

Alternatively, other water removal methods can be employed although this would give up the advantage of recycle to the Li removal step. Also alternatively the lithium can be removed by conventional means prior to introduction of the effluent from reactor 12 into contact vessel 20 for deprotection.

Figure 2:
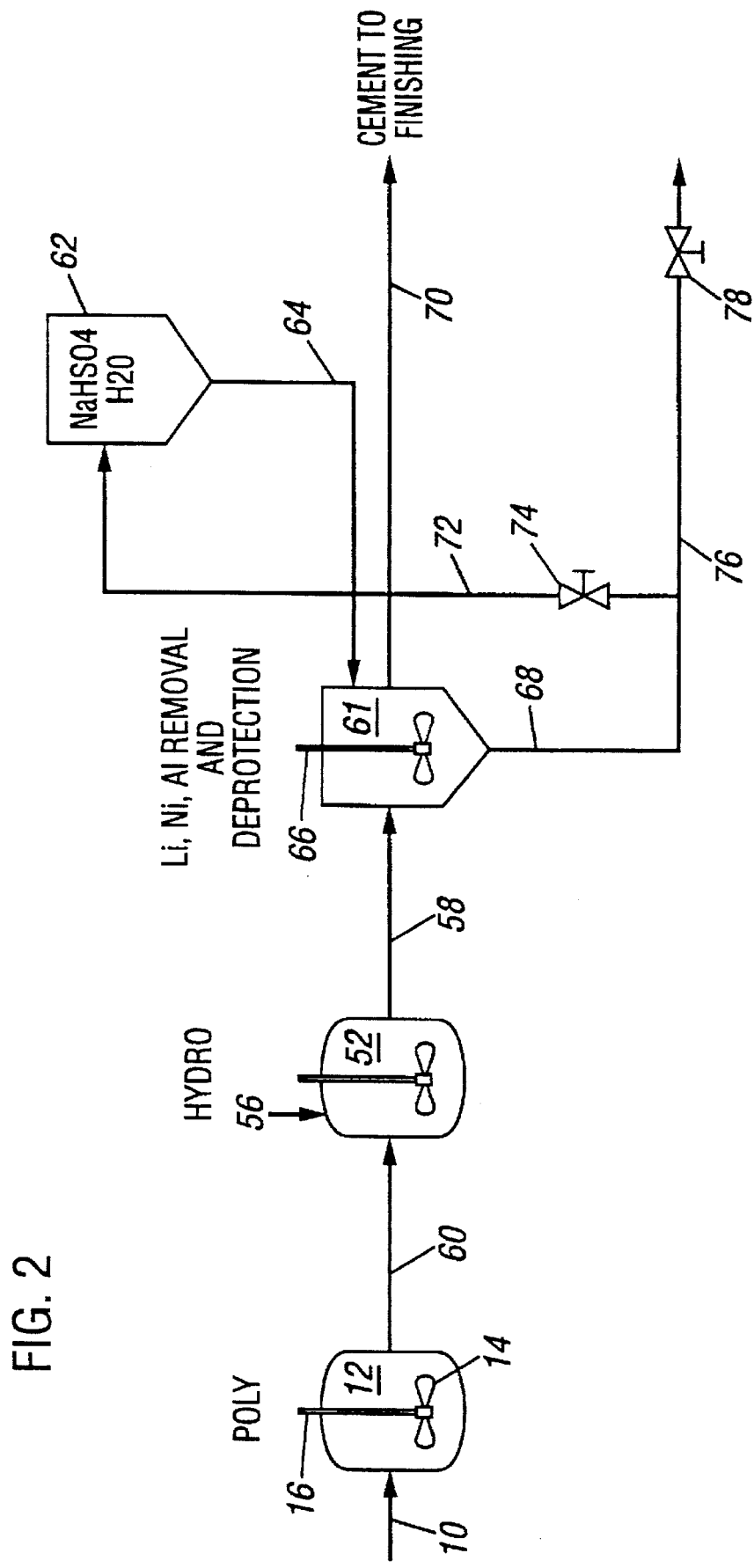
FIG. 2 is a flow diagram of an alternative embodiment of the invention wherein polymer is produced, hydrogenated and thereafter metal contaminants removed.

Referring now to FIG. 2, polymer cement from reactor 12 is introduced into hydrogenation vessel 52 via line 60 which is equivalent to line 54 of FIG. 1, it being understood that there is no initial lithium removal step as in FIG. 1 and generally no drying step either since the effluent should be dry at this stage. Effluent from hydrogenation vessel 52 is removal via line 58 and introduced into a zone for combined catalyst removal and deprotection formed by deprotection vessel 61. Sodium bisulphate monohydrate is introduced from an alternative storage zone defined by alternative storage vessel 62 via eighth transfer line 64 into the deprotection vessel 61 where it is contacted with the elastomer cement by means of agitator 66. A heavier molten phase of excess sodium bisulphate monohydrate containing both lithium from the initiator and nickel and aluminum hydrogenation catalyst is withdrawn via metal containing salt removal line 68 and polymer cement is withdrawn via alternative product removal line 70. Deprotection vessel 61 can be operated with an excess of molten salt if desired so as to give a higher salt to organic ratio in deprotection vessel 61. This excess is then withdrawn via line 72 and recycled to alternative storage vessel 62 via line 72 controlled by valve 74. Partially spent salt is removed via line 76 controlled by line 78 for recycle, discard or purification.

Thus, in accordance with this invention, α-ω-diol polymers are produced by the use of protected functional initiators. One family of PFIs produces hydroxy functionality in polymer molecules by hydrolysis of a protecting group to produce the terminal alcohol. As shown in FIG. 2, this embodiment of the invention makes possible the concurrent (1) hydrolysis of the protecting group to produce OH terminated polymer; (2) removal of metal incorporated during synthesis of the polymer (Li) and (3) removal of metals introduced during optional hydrogenation (Ni and Al).

EXAMPLES

Example 1

Removal of lithium, nickel, and aluminum from polymer cement; with simultaneous production of hydroxide functionality by hydrolysis of a silanol protecting group.

410 g of 20% cyclohexane solution of a polymer produced by polymerizing butadiene with a silicon-base protected functional initiator (3-lithio-2,2-dimethyl-1-trimethylsilyloxypropane) was placed in a jacketed kettle with 46.5 g sodium bisulfate monohydrate. The phases were heated to 64° C. where the salt was molten and stirred while slowly bubbling a gas mixture of 5% oxygen in nitrogen through the solution. The levels of residual metals in the solution were reduced as shown:

|    | Pre-treatment | Post-treatment |
|----|---------------|----------------|
| Li | 169 ppm       | 5 ppm          |
| Ni | 59 ppm        | <2 ppm         |
| Al | 62 ppm        | <2 ppm         |

Simultaneously the silicon-based protecting group had been completely hydrolyzed as determined by proton NMR and HPLC.

Example 2

Removal of Li, Ni, and Al from a polymer cement by sodium dihydrogen phosphate dihydrate.

600 g of a 20% solution of a polymer produced by polymerizing butadiene with a silicon-based protected functional initiator (3-lithio-2,2-dimethyl-1-trimethylsilyloxypropane) was contacted with 60 g of sodium dihydrogen phosphate dihydrate and heated to 73° C. where the salt was molten and stirred in like manner for 6 hours. Treatment with the phosphate salt produced substantial reductions in the level of residual metals as shown.

|    | Pre-treatment | Post-treatment |
|----|---------------|----------------|
| Li | 390 ppm       | 61 ppm         |
| Ni | 181 ppm       | 96 ppm         |
| Al | 165 ppm       | 86 ppm         |

While this invention has been described in detail for the purpose of illustration, it is not to be construed as limited thereby but is intended to cover all changes and modifications within the spirit and scope thereof.

What is claimed is:

1. A process comprising:
   polymerizing a monomer selected from the group consisting of conjugated alkadienes, monoalkenyl-substituted aromatic compounds and mixtures thereof with a protected functional initiator to give a polymer cement comprising alkali metal terminated polymer and solvent; and
   contacting said polymer cement with a molten component capable of deprotecting said polymer.

2. A method according to claim 1 wherein said protected functional initiator has the formula $R_3Si$—O—R'—Li where the R groups are alkyl or a pair of alkyl groups and hydrogen, and R' is an alkylene group.

3. A method according to claim 2 wherein said protected functional initiator is 3-lithio-2,2-dimethyl-1-trimethylsilyloxypropane.

4. A method according to claim 1 wherein said alkali metal is lithium and said lithium is removed from said polymer cement prior to said contacting, thereby forming a second polymer cement which is contacted with said molten component.

5. A method according to claim 1 wherein said alkali metal is lithium and said polymer cement is passed directly to said contacting so as to both deprotect and remove lithium.

6. A method according to claim 1 wherein said alkali metal is lithium and wherein said polymer cement is passed to a hydrogenation zone and subjected to hydrogenation prior to said contacting and wherein said contacting deprotects, removes lithium, and removes hydrogenation catalyst residues.

7. A method according to claim 1 wherein said polymerizing is carried out in a hydrocarbon solvent.

8. A method according to claim 1 wherein said polymer is an elastomer and wherein said contacting is carried out at a temperature within the range of 50° to 80° C.

9. A method according to claim 8 wherein said molten component is $NaHSO_4.H_2O$ and wherein after said contacting a thus contacted polymer cement is passed to a drying zone and contacted with $NaHSO_4$ to absorb water thus producing $NaHSO_4.H_2O$ which is recycled to a $NaHSO_4.H_2O$ storage zone.

10. A method according to claim 1 wherein said molten component is a salt or a salt hydrate.

11. A method according to claim 1 wherein said molten component is $NaHSO_4.H_2O$.

12. A method according to claim 11 wherein said molten component is separated from a thus treated polymer solution.

13. A method according to claim 12 wherein said separation is carried out by a liquid-liquid phase separation.

14. A method according to claim 12 wherein said separating is carried out on a continuous basis by liquid-liquid phase separation.

15. A method according to claim 14 wherein said protected functional initiator has the formula $R_3Si$—O—R'Li where the R groups are alkyl or a pair of alkyl groups and hydrogen, and R' is an alkylene group.

16. A process comprising
   Polymerizing, in a hydrocarbon solvent, a monomer selected from the group consisting of conjugated alkadienes, monoalkenyl-substituted aromatic compounds and mixtures thereof with a protected functional initiator having the formula $R_3Si$—O—R'Li where the R groups are alkyl or a pair of alkyl groups and hydrogen and R' is an alkylene group, to give a first polymer cement comprising lithium terminated polymer and solvent;

passing said first polymer cement to a hydrogenation zone and contacting said lithium terminated polymer with hydrogen in the presence of a metal-containing hydrogenation catalyst to produce a second polymer cement comprising hydrogenated lithium terminated polymer and hydrogenated catalyst residue;

contacting said second polymer cement with a molten component capable of deprotecting said hydrogenated polymer, reacting with said lithium and reacting with said hydrogenation catalyst residues.

17. A method according to claim 16 wherein said hydrogenation catalyst residues comprise nickel and aluminum.

18. A method according to claim 17 wherein said molten component is $NaHSO_4 \cdot H_2O$, said protected functional initiator is 3-lithio-2,2-dimethyl-1-trimethylsilyloxypropane and said monomer is butadiene.

19. A method according to claim 16 wherein said monomer is selected from the group consisting of butadiene, isoprene, styrene, mixtures thereof and sequentially introduced styrene followed by at least one of butadiene and isoprene.

20. A process comprising:

polymerizing a monomer selected from the group consisting of conjugated alkadienes, monoalkenyl-substituted aromatic compounds and mixtures thereof with a protected functional initiator;

terminating said polymerization with a terminating agent to give a polymer cement comprising polymer having at least one alkoxy-alkali metal terminal group, and solvent; and contacting said polymer cement with a molten component capable of deprotecting said polymer.

* * * * *